United States Patent
Yoshizaki et al.

(10) Patent No.: US 9,441,558 B2
(45) Date of Patent: Sep. 13, 2016

(54) CONTROLLER FOR INTERNAL COMBUSTION ENGINES

(75) Inventors: Satoshi Yoshizaki, Gotenba (JP);
Shinichi Soejima, Gotenba (JP);
Satoru Tanaka, Odawara (JP);
Kiyonori Takahashi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 126 days.

(21) Appl. No.: 14/404,684

(22) PCT Filed: Jun. 4, 2012

(86) PCT No.: PCT/JP2012/064385
§ 371 (c)(1),
(2), (4) Date: Dec. 1, 2014

(87) PCT Pub. No.: WO2013/183104
PCT Pub. Date: Dec. 12, 2013

(65) Prior Publication Data
US 2015/0101569 A1    Apr. 16, 2015

(51) Int. Cl.
*F02D 41/00* (2006.01)
*F02D 41/02* (2006.01)
(Continued)

(52) U.S. Cl.
CPC .......... *F02D 41/0007* (2013.01); *B60W 10/06* (2013.01); *B60W 30/19* (2013.01);
(Continued)

(58) Field of Classification Search
CPC ............. F02D 41/0007; F02D 11/105; F02D 41/023; F02D 2009/0228; F02D 2200/602; F02D 2041/1418; F02D 2250/18; F02B 37/12; B60W 30/19; B60W 10/06; B60W 2710/0672; Y02T 10/144

USPC .......................................... 701/110, 101, 103
See application file for complete search history.

(56) References Cited

U.S. PATENT DOCUMENTS

2004/0194466 A1* 10/2004 Kawamura ............. F02B 33/34
60/612
2005/0027431 A1*  2/2005 Todoroki .............. F01N 3/0821
701/105
(Continued)

FOREIGN PATENT DOCUMENTS

JP    H05-180027 A    7/1993
JP    2007-198157 A   8/2007
(Continued)

*Primary Examiner* — Hung Q Nguyen
(74) *Attorney, Agent, or Firm* — Kenyon & Kenyon, LLP (57) ABSTRACT

An object of this invention is, with respect to a torque-demand-control type controller that subjects two kinds of actuators provided upstream and downstream in an intake passage to coordinated operations based on a requested torque for an internal combustion engine, to enable realization of a pulse-like torque change in a torque decreasing direction that is requested, for example, when performing an upshift operation in an electronically controlled automatic transmission. To achieve this object, according to a controller for an internal combustion engine of this invention, when a pulse component in a torque decreasing direction is included in a requested torque, a second requested torque that does not include the pulse component is generated. In this case, a first actuator provided on the downstream side in the intake passage is operated based on the requested torque. On the other hand, although a second actuator provided on the upstream side in the intake passage is operated based on the requested torque when there is not a valid value of the second requested torque, the second actuator is operated based on the second requested torque when there is a valid value of the second requested torque.

6 Claims, 2 Drawing Sheets

(51) Int. Cl.
  *F02D 11/10*   (2006.01)
  *B60W 10/06*   (2006.01)
  *B60W 30/19*   (2012.01)
  *F02B 37/12*   (2006.01)
  *F02D 41/14*   (2006.01)
  *F02D 9/02*    (2006.01)

(52) U.S. Cl.
  CPC ............ *F02B 37/12* (2013.01); *F02D 11/105* (2013.01); *F02D 41/023* (2013.01); *B60W 2710/0672* (2013.01); *F02D 2009/0228* (2013.01); *F02D 2041/1418* (2013.01); *F02D 2200/602* (2013.01); *F02D 2250/18* (2013.01); *Y02T 10/144* (2013.01)

(56) References Cited

U.S. PATENT DOCUMENTS

| | | | |
|---|---|---|---|
| 2005/0071066 A1* | 3/2005 | Rose | B60W 10/06 701/54 |
| 2007/0254772 A1 | 11/2007 | Satou et al. | |
| 2010/0263638 A1* | 10/2010 | Kogo | F02B 37/004 123/562 |
| 2015/0101569 A1* | 4/2015 | Yoshizaki | F02D 41/023 123/344 |

FOREIGN PATENT DOCUMENTS

| | | |
|---|---|---|
| JP | 2007-292031 A | 11/2007 |
| JP | 2010-024908 A | 2/2010 |
| JP | 2010-112214 A | 5/2010 |
| JP | 2010-216419 A | 9/2010 |

* cited by examiner

Fig.1

- Degree of opening of accelerator
- Engine rotation speed
- Other information

CONTROLLER FOR INTERNAL COMBUSTION ENGINES

CROSS-REFERENCE TO RELATED APPLICATION

This is a national phase application based on the PCT International Patent Application No. PCT/JP2012/064385 filed Jun. 4, 2012, the entire contents of which are incorporated herein by reference.

TECHNICAL FIELD

The present invention relates to a controller for an internal combustion engine, and more particularly to a torque-demand-control type controller that subjects two kinds of actuators that are provided in an intake passage to coordinated operations based on a requested torque with respect to the internal combustion engine.

BACKGROUND ART

Torque-demand-control type controllers disclosed, for example, in Patent Literature 1 to 4 that are described hereunder are known as controllers for an internal combustion engine. In the case of a torque-demand-control type controller, an actuator is operated based on a requested torque. If the internal combustion engine that is the object of control has a turbo-supercharger with a waste gate valve, torque control can be performed through coordinated operations by the waste gate valve and a throttle. In such case, a pressure upstream of the throttle is controlled by operation of the waste gate valve, and an intake air amount is controlled by operation of the throttle.

In this connection, in addition to a driver-requested torque that is calculated based on the degree of opening of an accelerator pedal, requested torques with respect to an internal combustion engine also include requested torque from various on-board systems such as a traction control system, a vehicle stability control system, and an electronically controlled automatic transmission. In many cases, a system-requested torque that such on-board systems request is a torque that changes quickly in comparison to a driver-requested torque. For example, when an upshift operation is performed by an electronically controlled automatic transmission, a torque that changes in a pulse shape in a torque decreasing direction is requested from the internal combustion engine by the electronically controlled automatic transmission.

Figure 4:
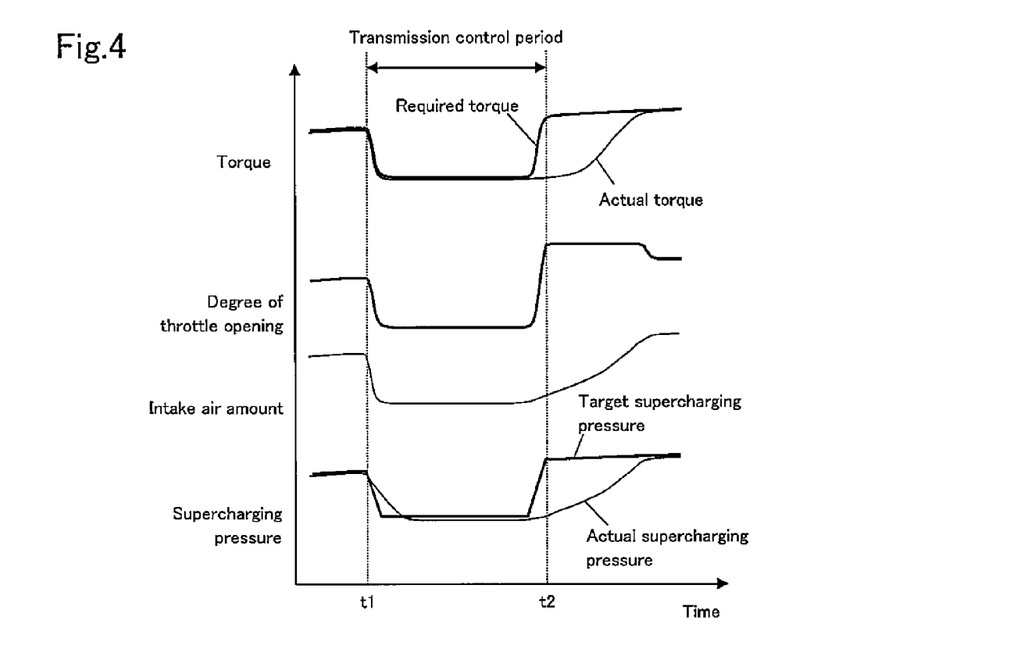
FIG. 4 is a time chart illustrating a specific example of a result of control by a conventional controller.

FIG. 4 illustrates control results in a case where, in the case of a conventional controller that subjects a waste gate valve and a throttle to coordinated operations, torque is requested that changes in a pulse shape in a torque decreasing direction in accordance with a period of transmission control of an electronically controlled automatic transmission. According to this conventional controller, when the requested torque changes, a target supercharging pressure relating to control of the waste gate valve is changed in accordance therewith, and a target degree of throttle opening relating to control of the throttle is also changed. Consequently, in a case where the requested torque changes in a pulse shape in a torque decreasing direction, a target supercharging pressure and a target degree of throttle opening are also caused to change in a pulse shape in a decreasing direction, respectively.

The responsiveness of the actual supercharging pressure with respect to an opening operation of the waste gate valve is high, and the actual supercharging pressure decreases rapidly to track a decrease in the target supercharging pressure. Furthermore, the responsiveness of the actual intake air amount with respect to a closing operation of the throttle is also high, and the actual intake air amount decreases rapidly to track a decrease in the target degree of throttle opening. That is, according to the conventional controller, in a case where the requested torque decreases in a step shape at a time point t1, since the intake air amount can be caused to decrease to track the step-shaped change, the step-shaped torque decrease that was requested can be achieved with respect to the actual torque.

However, because of the characteristics of a turbo-supercharger, the responsiveness of the actual supercharging pressure with respect to a closing operation of a waste gate valve is not high, and there is a delay in increasing the actual supercharging pressure with respect to an increase in the target supercharging pressure. Unless a supercharging pressure that acts upstream of the throttle increases, it is difficult for the intake air amount to increase irrespective of how much the throttle is opened. Consequently, an increase in the actual intake air amount with respect to an increase in the target degree of throttle opening is delayed. That is, according to the conventional controller, in a case where the requested torque increases in a step shape at a time point t2, it is difficult to rapidly increase the intake air amount to track the step-shaped change, and it is thus difficult to achieve the requested step-shaped torque increase in the actual torque.

As described above, according to the conventional controller, in a case where a pulse-like torque change in a torque decreasing direction is requested, although the torque can be caused to decrease in a step shape, it has been difficult to immediately thereafter increase the torque in a step shape. This problem is not limited to only a controller that subjects a waste gate valve and a throttle to coordinated operations. The problem also applies to a controller that takes a supercharged engine with a variable displacement-type turbo-supercharger as a control object, and subjects the variable displacement-type turbo-supercharger and a throttle to coordinated operations. It is also a problem that applies in general to torque-demand-control type controllers that subject two kinds of actuators that are provided upstream and downstream in an intake passage to coordinated operations based on a requested torque, such as a controller that subjects a throttle and an intake valve with a variable lift mechanism to coordinated operations.

CITATION LIST

Patent Literature

Patent Literature 1: Japanese Patent Laid-Open No. 2007-198157
Patent Literature 2: Japanese Patent Laid-Open No. 2010-112214
Patent Literature 3: Japanese Patent Laid-Open No. 2007-292031
Patent Literature 4] Japanese Patent Laid-Open No. 2010-216419

SUMMARY OF INVENTION

The present invention has been conceived in view of the above described problems, and an object of the present invention is, in a torque-demand-control type controller that subjects two kinds of actuators that are provided upstream and downstream in an intake passage to coordinated operations based on a requested torque with respect to an internal combustion engine, to enable the realization of a pulse-like torque change in a torque decreasing direction that is requested, for example, at a time of an upshift operation of an electronically controlled automatic transmission.

A controller for an internal combustion engine according to the present invention takes an internal combustion engine having a first actuator and a second actuator as a control object. The first actuator is provided at a first position in an intake passage of the internal combustion engine, and acts on a pressure on a downstream side of the first position. The second actuator is provided at a second position that is upstream of the first position in the same intake passage, and acts on a pressure on a downstream side of the second position. Preferably, the first actuator is an actuator that acts so as to decrease a pressure downstream of the first position relative to a pressure upstream of the first position. Further, preferably, the second actuator is an actuator that acts so as to increase a pressure downstream of the second position relative to a pressure upstream of the second position. Note that the second actuator may be an actuator with respect to which a rate of change in a pressure downstream of the second position in response to an operation thereof is slower than a rate of change in a pressure downstream of the first position in response to an operation of the first actuator. As specific examples of the respective actuators, a throttle may be mentioned as an example of the first actuator, and a supercharger with a control device that controls a rotation speed of a compressor may be mentioned as an example of the second actuator.

The controller for an internal combustion engine according to the present invention generates a first requested torque with respect to the internal combustion engine based on a request from a driver and a request from an on-board system. In a case where a pulse component in a torque decreasing direction is included in the first requested torque, the controller for an internal combustion engine according to the present invention also generates a second requested torque that does not include a pulse component. Preferably, what a value of the first requested torque will be after the pulse component passes is predicted, and the predicted value is generated as the second requested torque.

The controller for an internal combustion engine according to the present invention operates the first actuator based on the first requested torque, and operates the second actuator based on the first requested torque or the second requested torque. Specifically, the controller operates the second actuator based on the first requested torque when there is no valid value of the second requested torque, and operates the second actuator based on the second requested torque when there is a valid value of the second requested torque.

Preferably, the controller for an internal combustion engine according to the present invention calculates a first target state amount based on the first requested torque, and calculates a second target state amount based on the second requested torque. For example, a target intake air amount or a target intake pipe pressure can be used as a target state amount. According to this preferable example, the controller for an internal combustion engine according to the present invention calculates an operation amount of the first actuator based on the first target state amount, compares the first target state amount and the second target state amount, and calculates an operation amount of the second actuator based on the larger value between the first target state amount and the second target state amount.

That is, in a situation in which a pulse component in a torque decreasing direction is not included in the first requested torque, the controller for an internal combustion engine according to the present invention operates both of the first actuator and the second actuator based on the first requested torque. However, in a situation in which a pulse component in a torque decreasing direction is included in the first requested torque, although the controller operates the first actuator based on the first requested torque, the controller operates the second actuator based on the second requested torque that does not include the pulse component.

According to the method of operating actuators that is described above, in a case where a pulse component in a torque decreasing direction is included in the first requested torque, since only the first actuator operates so as to track the pulse component, a pressure upstream of the first actuator that is a pressure on which the second actuator acts is maintained and is not caused to decrease. As a result, after the torque is caused to decrease in a step shape by an operation of the first actuator, the torque can be increased in a step shape by an operation in an opposite direction of the first actuator. That is, a pulse-like torque change in a torque decreasing direction can be achieved.

DESCRIPTION OF EMBODIMENT

Hereunder, an embodiment of the present invention will be described with reference to the drawings.

Figure 1:
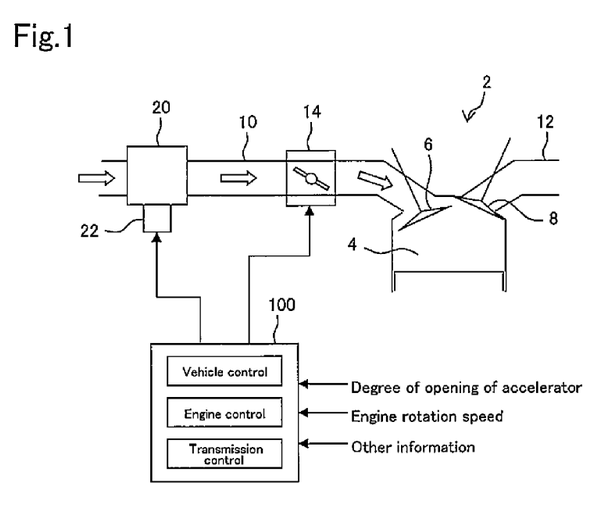
FIG. 1 is a schematic diagram illustrating the configuration of an internal combustion engine in which a controller according to an embodiment of the present invention is used.

FIG. 1 is a schematic diagram illustrating the configuration of an internal combustion engine in which a controller according to the present embodiment is used. An intake passage 10 and an exhaust passage 12 are connected to a combustion chamber 4 of an internal combustion engine 2. Communication between the combustion chamber 4 and the intake passage 10 is controlled by an intake valve 6. Communication between the combustion chamber 4 and the exhaust passage 12 is controlled by an exhaust valve 8. A throttle 14 is arranged in the intake passage 10. A turbo-supercharger 20 with a waste gate valve 22 is installed on the upstream side of the throttle 14 in the intake passage 10. According to this configuration, the rotation speed of a compressor of the turbo-supercharger 20 can be controlled by operation of the waste gate valve 22, and thus a supercharging pressure (pressure upstream of the throttle 14) can be changed. Further, an intake pipe pressure (pressure downstream of the throttle 14) can be changed by operation of the throttle 14, and thus an intake air amount that is drawn into the combustion chamber 4 can be changed.

Operations of the internal combustion engine 2 are controlled by an on-board ECU (electronic control unit) 100. The ECU 100 is equipped with various functions, such as functions for vehicle control, engine control and transmission control. The controller according to the present embodiment is realized as one part of the functions of the ECU 100. Various kinds of information relating to the operating state and operating conditions of the internal combustion engine 2, such as the degree of opening of an accelerator pedal and the engine rotation speed is input to the ECU 100. When the ECU 100 functions as the controller according to the present embodiment, the ECU 100 controls operations of various actuators including the throttle 14 and the waste gate valve 22 in accordance with a control program that is stored in a memory.

Figure 2:
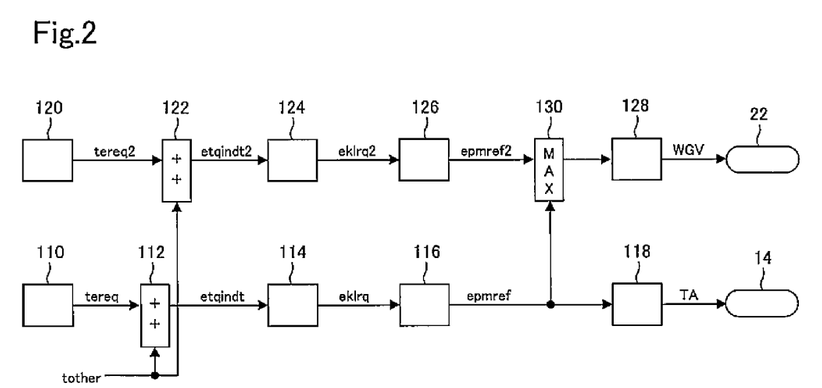
FIG. 2 is a block diagram illustrating the configuration of the controller according to the embodiment of the present invention.

FIG. 2 is a functional block diagram illustrating the configuration of the controller that is realized as the result of the ECU 100 functioning in accordance with the control program. The controller according to the present embodiment is constituted by a plurality of arithmetic elements 110, 112, 114, 116, 118, 120, 122, 124, 126, 128 and 130, and calculates various operation amounts of the throttle 14 and the waste gate valve 22 by means of arithmetic operations performed by the aforementioned arithmetic elements. Note that these arithmetic elements are elements that are realized virtually as the result of execution of a control program.

The controller according to the present embodiment has the arithmetic element 110 that generates a requested torque (first requested torque). The arithmetic element 110 calculates and outputs a requested torque (tereq) with respect to the internal combustion engine 2. The requested torque (tereq) includes a driver-requested torque that is determined in accordance with the degree of opening of the accelerator pedal, and a system-requested torque that is torque that is requested from various on-board systems such as a traction control system or an electronically controlled automatic transmission. The system-requested torque includes various kinds of torque, such as torque for traction control, torque for sideslip prevention control, torque that is necessary for maintaining the idling rotation speed, torque for vibration suppression control of the vehicle, and torque for transmission control of the electronically controlled automatic transmission.

The requested torque (tereq) generated by the arithmetic element 110 is input to the arithmetic element 112. At the arithmetic element 112, other torque (tother) that includes friction torque and external load torque is added to the requested torque (tereq), and the total value thereof is output as a target indicated torque (etqindt) of the internal combustion engine 2.

The target indicated torque (etqindt) calculated by the arithmetic element 112 is input to the arithmetic element 114. The arithmetic element 114 calculates an intake air amount that is required to achieve the target indicated torque (etqindt). A map in which the torque and the engine rotation speed are adopted as arguments is used to calculate the intake air amount. The intake air amount obtained as the calculation result is output as a target intake air amount (eklrq) of the internal combustion engine 2.

The target intake air amount (eklrq) calculated by the arithmetic element 114 is input to the arithmetic element 116. The arithmetic element 116 calculates an intake pipe pressure that is required to achieve the target intake air amount (eklrq). An intake valve model in which the relation between the intake air amount and the intake pipe pressure is approximated by a function is used to calculate the intake pipe pressure. The respective coefficients of the function that represents the intake valve model are determined using a map in which the respective valve timings of the intake valve and the exhaust valve as well as the degree of opening of the waste gate valve are adopted as arguments. The intake pipe pressure obtained as the calculation result is output as a target intake pipe pressure (epmref) of the internal combustion engine 2.

The target intake pipe pressure (epmref) calculated by the arithmetic element 116 is input to the arithmetic element 118. The arithmetic element 118 calculates a degree of throttle opening that is required to achieve the target intake pipe pressure (epmref). An air inverse model is used to calculate the degree of throttle opening. The air inverse model is an inverse model of an air model that represents, by means of a physical model, the relation that is established between the intake pipe pressure and the degree of throttle opening. The air model is constituted by a throttle model that is represented by a throttling equation, and an intake pipe model that is represented by a flow rate conservation equation and an energy conservation equation. The degree of throttle opening obtained as the result of the calculation using the air inverse model is output as a target degree of throttle opening (TA) of the internal combustion engine 2. The controller according to the present embodiment operates the throttle 14 in accordance with the target degree of throttle opening (TA).

The target intake pipe pressure (epmref) calculated by the arithmetic element 116 is also input to the arithmetic element 130 in parallel with input thereof to the arithmetic element 118. A second target intake pipe pressure (epmref2) that is obtained as the result of arithmetic operations performed by the arithmetic elements 120, 122, 124 and 126 that are described next is also input to the arithmetic element 130.

The arithmetic element 120 generates a forenotice torque (tereq2) that is the second requested torque. The forenotice torque (tereq2) generated at the arithmetic element 120 is normally set to a lower limit of torque that can be realized, that is, an invalid value. However, in a case where a pulse component in a torque decreasing direction is included in the requested torque (tereq) generated at the arithmetic element 110, the forenotice torque (tereq2) is set to a valid value only for a period that corresponds to the pulse component. The valid value is a predicted value of what the requested torque (tereq) will be after the pulse component passes. Alternatively, a value obtained by excluding the pulse component from the current requested torque (tereq) may be taken as the valid value of the forenotice torque (tereq2).

A specific example of the forenotice torque (tereq2) will now be described. According to this example, when performing an upshift operation in transmission control of an electronically controlled automatic transmission, a torque decrease request of around 500 ms is output from the controller of the electronically controlled automatic transmission. In response to the torque decrease request, the arithmetic element 110 generates a pulse component in a torque decreasing direction, and adds the pulse component onto a base value of the requested torque (tereq). During this period the arithmetic element 120 predicts what the requested torque (tereq) will be after the transmission control ends based on the degree of opening of the accelerator pedal, and sets the predicted value as the forenotice torque (tereq2). Subsequently, when the transmission control ends and the requested torque (tereq) recovers to an equal value to the forenotice torque (tereq2) or a value that is greater than the forenotice torque (tereq2), the arithmetic element 120 returns the value of the forenotice torque (tereq2) to an invalid value again.

The forenotice torque (tereq2) generated at the arithmetic element 120 is input to the arithmetic element 122. At the arithmetic element 122, the other torque (tother) that includes friction torque and external load torque is added to the forenotice torque (tereq2), and the total value thereof is output as a second target indicated torque (etqindt2).

The second target indicated torque (etqindt2) calculated at the arithmetic element 122 is input to the arithmetic element 124. The arithmetic element 124 calculates an intake air amount that is required to achieve the second target indicated torque (etqindt2). A map that is used to calculate the intake air amount is the same as the map that is used by the arithmetic element 114. However, in the calculation of the intake air amount by the arithmetic element 124, a target engine rotation speed that is a predicted value of the engine rotation speed after a pulse component passes (that is, after a gear change), and not the current of engine rotation speed, may be used as an argument of the map. The intake air amount obtained by the calculation is output as a second target intake air amount (eldrq2).

The second target intake air amount (eklrq2) calculated at the arithmetic element 124 is input to the arithmetic element 126. The arithmetic element 126 calculates an intake pipe pressure that is required to achieve the second target intake air amount (eklrq2). An intake valve model that is used to calculate the intake pipe pressure is the same as the intake valve model used at the arithmetic element 116. The intake pipe pressure obtained as a result of the calculation is output as a second target intake pipe pressure (epmref2). Note that, the arithmetic operations by the arithmetic elements 122, 124 and 126 are performed only when the forenotice torque (tereq2) is a valid value. When the forenotice torque (tereq2) is an invalid value, the arithmetic operations by the arithmetic elements 122, 124 and 126 are stopped to reduce the arithmetic load of the ECU 100.

The arithmetic element 130 compares the target intake pipe pressure (eptnref) calculated at the arithmetic element 116 and the second target intake pipe pressure (epmref2) calculated at the arithmetic element 126, and selects the larger value. The target intake pipe pressure (epmref) is selected in a case where the forenotice torque (tereq2) is an invalid value, that is, a case where a pulse component in a torque decreasing direction is not included in the requested torque (tereq). The second target intake pipe pressure (epmref2) is selected in a case where the forenotice torque (tereq2) is a valid value, that is, a case where a pulse component in a torque decreasing direction is included in the requested torque (tereq). Hence, when performing an upshift operation in transmission control of an electronically controlled automatic transmission, the second target intake pipe pressure (epmref2) is selected by the arithmetic element 130.

The target intake pipe pressure (epmref or epmref2) that was selected by the arithmetic element 130 is input to the arithmetic element 128. The arithmetic element 128 calculates the degree of opening of the waste gate valve that is required to achieve the selected target intake pipe pressure. In the calculation of the degree of opening of the waste gate valve, first, a value obtained by adding a predetermined value a to the target intake pipe pressure is determined as a target supercharging pressure. The predetermined value a is set to a value that is equal to or greater than zero. Subsequently, a degree of opening of the waste gate valve that corresponds to the target supercharging pressure is calculated using a map or a model that associates the supercharging pressure and the degree of opening of the waste gate valve. The degree of opening of the waste gate valve obtained by the calculation is taken as a target degree of opening of the waste gate valve (WGV) of the internal combustion engine 2. The controller according to the present embodiment operates the waste gate valve 22 in accordance with the target degree of opening of the waste gate valve (WGV). Note that, an operation amount of an actuator that drives the waste gate valve (for example, a duty ratio of a solenoid) may be used as the operation amount of the waste gate valve 22 instead of the degree of opening of the waste gate valve. For example, a configuration may be adopted in which a target duty ratio corresponding to a target supercharging pressure is determined using a map or a model, and the waste gate valve 22 is operated in accordance with the target duty ratio.

According to the above described configuration of the controller according to the present embodiment, in a situation in which a pulse component in a torque decreasing direction is not included in the requested torque (tereq), both the throttle 14 and the waste gate valve 22 are operated based on the requested torque (tereq). Hence, in the case of decreasing the requested torque (tereq), the throttle 14 is closed and the waste gate valve 22 is opened, while in the case of increasing the requested torque (tereq), the throttle 14 is opened and the waste gate valve 22 is closed. On the other hand, in a situation in which a pulse component in a torque decreasing direction is included in the requested torque (tereq), although the throttle 14 is operated based on the requested torque (tereq), the waste gate valve 22 is operated based on the forenotice torque (tereq2). The forenotice torque (tereq2) at this time is a future predicted value of the requested torque (tereq), and is a value obtained by excluding the pulse component from the requested torque (tereq). Therefore, while the degree of throttle opening changes in accordance with a pulse-like change in the requested torque (tereq), the degree of opening of the waste gate valve is maintained at a substantially constant degree of opening.

Next, results of control obtained by the controller according to the present embodiment will be described using FIG. 3.

Figure 3:
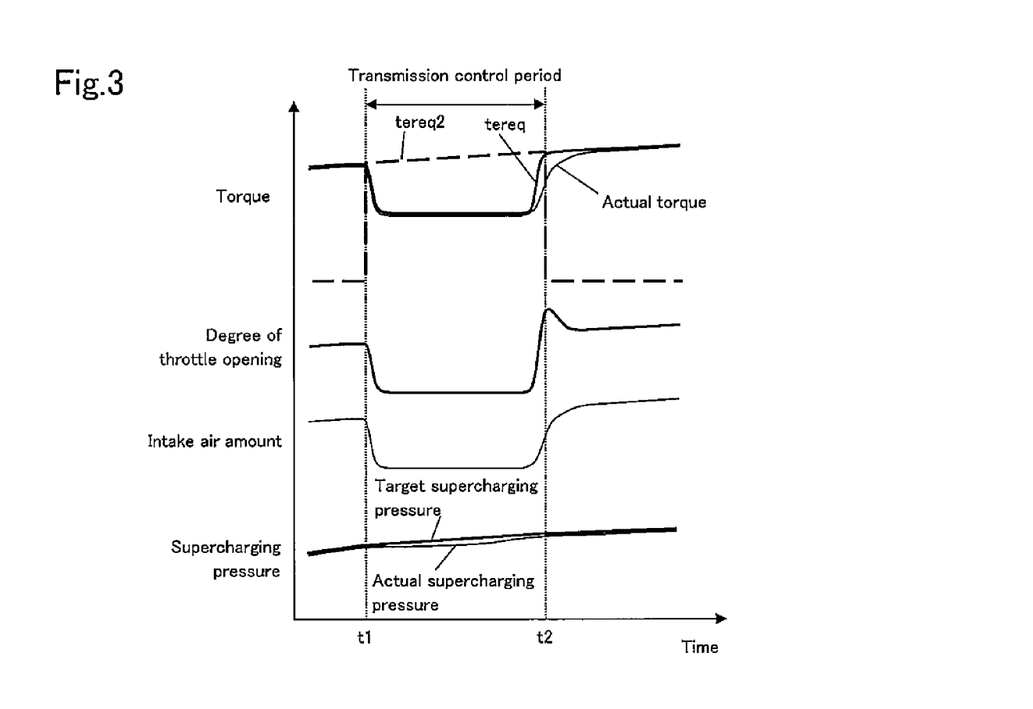
FIG. 3 is a time chart illustrating a specific example of a result of control by the controller according to the embodiment of the present invention.

FIG. 3 illustrates control results in a case where an upshift operation is performed in transmission control of an electronically controlled automatic transmission. As shown by a chart on a first tier in FIG. 3, in this case a pulse component in a torque decreasing direction that corresponds to a transmission control period from a time point t1 to a time point t2 is applied to the requested torque (tereq). Simultaneously therewith, the value of the forenotice torque (tereq2) is switched from an invalid value to a valid value that corresponds to a future predicted value of the requested torque (tereq).

The target degree of throttle opening is determined based on the requested torque (tereq). Therefore, when performing an upshift operation, as shown by a chart on a second tier in FIG. 3, the degree of throttle opening is changed in accordance with the pulse-like change in the requested torque (tereq). On the other hand, although the target supercharging pressure is determined based on the requested torque (tereq) when outside the transmission control period, the target supercharging pressure is determined based on the forenotice torque (tereq2) when within the transmission control period. Therefore, as shown by a chart on a fourth tier in FIG. 3, the target supercharging pressure is substantially flat and the actual supercharging pressure is maintained and is not caused to decrease. As a result, as shown by a chart on a third tier in FIG. 3, the intake air amount changes to track the change in the degree of throttle opening. That is, the intake air amount decreases in a step shape accompanying the step-shaped decrease in the degree of throttle opening at the time point t1, and thereafter the intake air amount increases in a substantially step shape to track the step-shaped increase in the degree of throttle opening at the time point t2. Thus, as shown by the chart on the first tier in FIG. 3, the actual torque changes to track the requested torque (tereq), and a pulse-like torque change in the torque decreasing direction is achieved.

As will be understood from the above described control example, according to the controller of the present embodiment, in a case where a pulse component in a torque decreasing direction is included in the requested torque (tereq), the waste gate valve 22 is not operated and only the throttle 14 is operated to track the pulse component. Consequently, a supercharging pressure on an upstream side of the throttle 14 is maintained and is not caused to decrease. As a result, after the torque is decreased in a step shape by a movement in the closing direction of the throttle 14, the torque can be increased in a step shape by a movement in the opening direction of the throttle 14. That is, according to the controller of the present embodiment, for example, a pulse-like torque change in a torque decreasing direction that is requested when performing an upshift operation in an electronically controlled automatic transmission can be achieved.

The foregoing is a description of an embodiment of the present invention. However, the present invention is not limited to the above described embodiment, and various modifications can be made without departing from the spirit and scope of the present invention. For example, the present invention may be modified and implemented as described hereunder.

According to a first modification, the target intake air amount (eklrq) that is calculated based on the requested torque and the second target intake air amount (eldrq2) that is calculated based on forenotice torque are compared, and the larger value is selected. Subsequently, the target degree of opening of the waste gate valve is calculated using the arithmetic elements 126 and 128 based on the selected target intake air amount. Similar advantageous effects as those obtained in the above described embodiment can also be obtained in the case of this modification.

According to a second modification, the target indicated torque (etqindt) that is calculated based on the requested torque and the second target indicated torque (etqindt2) that is calculated based on the forenotice torque are compared, and the larger value is selected. Subsequently, the target degree of opening of the waste gate valve is calculated using the arithmetic elements 124, 126 and 128 based on the selected target indicated torque. Similar advantageous effects as those obtained in the above described embodiment can also be obtained in the case of this modification.

The controller according to the present invention can be applied not only to an internal combustion engine having a turbo-supercharger with a waste gate valve, but also to an internal combustion engine having a variable displacement-type turbo-supercharger, an internal combustion engine having a mechanical supercharger with an electromagnetic clutch, or an internal combustion engine having an electric motor-driven supercharger. That is, as long as an internal combustion engine has a supercharger with a control device that controls the rotation speed of the compressor, the internal combustion engine can be adopted as a control object of the controller according to the present invention. In such a case, the throttle is regarded as the first actuator, and the supercharger with a control device is regarded as the second actuator.

In addition, a first actuator and a second actuator with respect to the controller according to the present invention are not limited to a combination of a throttle and a supercharger with a control device. For example, if an internal combustion engine is one in which an air intake control valve is provided downstream of a throttle in an intake passage, the air intake control valve can be regarded as the first actuator and the throttle can be regarded as the second actuator, and the controller according to the present invention can be applied thereto. Further, if an intake valve is an intake valve in which a lift amount or a working angle is variable, the intake valve can be regarded as the first actuator and the throttle can be regarded as the second actuator, and the controller according to the present invention can be applied thereto.

REFERENCE SIGNS LIST

2 Internal combustion engine
4 Combustion chamber
6 Intake valve
10 Intake passage
14 Throttle
20 Turbo-supercharger
22 Waste gate valve
100 ECU
110 Arithmetic element that generates requested torque (first requested torque)
116 Arithmetic element that calculates target intake pipe pressure (first target state amount)
118 Arithmetic element that calculates target degree of throttle opening
120 Arithmetic element that generates forenotice torque (second requested torque)
126 Arithmetic element that calculates second target intake pipe pressure (second target state amount)
128 Arithmetic element that calculates target degree of opening of waste gate valve
130 Arithmetic element that selects larger value between target intake pipe pressure and second target intake pipe pressure

The invention claimed is:

1. A controller for an internal combustion engine having a first actuator that is provided at a first position in an intake passage of the internal combustion engine and that acts on a pressure on a downstream side of the first position, and a second actuator that is provided at a second position that is upstream of the first position in the intake passage and that acts on a pressure on a downstream side of the second position, the controller comprising:
  a first requested torque generation element that generates a first requested torque with respect to the internal combustion engine based on a request from a driver and a request from an on-board system;
  a second requested torque generation element that, in a case where a pulse component in a torque decreasing direction is included in the first requested torque, generates a second requested torque that does not include the pulse component;
  a first operation unit that operates the first actuator based on the first requested torque; and
  a second operation unit that operates the second actuator based on the first requested torque in a case where there is not a valid value of the second requested torque, and operating the second actuator based on the second requested torque in a case where there is a valid value of the second requested torque,
  wherein the second requested torque generation element predicts what a value of the first requested torque will be after the pulse component passes, and generates the predicted value as the second requested torque.

2. The controller for an internal combustion engine according to claim 1, wherein:
the first operation unit calculates an operation amount of the first actuator based on a first target state amount that is calculated based on the first requested torque; and
the second operation unit compares the first target state amount that is calculated based on the first requested torque and a second target state amount that is calculated based on the second requested torque, and calculates an operation amount of the second actuator based on a larger amount between the first target state amount and the second target state amount.

3. The controller for an internal combustion engine according to claim 1, wherein:
the first actuator is an actuator that acts so as to decrease a pressure downstream of the first position relative to a pressure upstream of the first position; and
the second actuator is an actuator that acts so as to increase a pressure downstream of the second position relative to a pressure upstream of the second position.

4. The controller for an internal combustion engine according to claim 3, wherein:
the first actuator is a throttle; and
the second actuator is a supercharger with a control device that controls a rotation speed of a compressor.

5. The controller for an internal combustion engine according to claim 1, wherein the second actuator is an actuator with respect to which a rate of change in a pressure downstream of the second position in response to an operation thereof is slower than a rate of change in a pressure downstream of the first position in response to an operation of the first actuator.

6. The controller for an internal combustion engine according to claim 5, wherein:
the first actuator is a throttle; and
the second actuator is a supercharger with a control device that controls a rotation speed of a compressor.

* * * * *

UNITED STATES PATENT AND TRADEMARK OFFICE
CERTIFICATE OF CORRECTION

PATENT NO. : 9,441,558 B2
APPLICATION NO. : 14/404684
DATED : September 13, 2016
INVENTOR(S) : S. Yoshizaki et al.

It is certified that error appears in the above-identified patent and that said Letters Patent is hereby corrected as shown below:

On the Title Page

At Item (57), change the Abstract from:
"An object of this invention is, with respect to a torque-demand-control type controller that subjects two kinds of actuators provided upstream and downstream in an intake passage to coordinated operations based on a requested torque for an internal combustion engine, to enable realization of a pulse-like torque change in a torque decreasing direction that is requested, for example, when performing an upshift operation in an electronically controlled automatic transmission. To achieve this object, according to a controller for an internal combustion engine of this invention, when a pulse component in a torque decreasing direction is included in a requested torque, a second requested torque that does not include the pulse component is generated. In this case, a first actuator provided on the downstream side in the intake passage is operated based on the requested torque. On the other hand, although a second actuator provided on the upstream side in the intake passage is operated based on the requested torque when there is not a valid value of the second requested torque, the second actuator is operated based on the second requested torque when there is a valid value of the second requested torque."

To:
-- With respect to a torque-demand-control type controller that subjects two kinds of actuators provided upstream and downstream in an intake passage to coordinated operations based on a requested torque for an internal combustion engine, the controller is to enable realization of a pulse-like torque change in a torque decreasing direction that is requested, for example, when performing an upshift operation in an electronically controlled automatic transmission. To achieve this, according to a controller for an internal combustion engine, when a pulse component in a torque decreasing direction is included in a requested torque, a second requested torque that does not include the pulse component is generated. In this case, a first actuator provided on the downstream side in the intake passage is operated based on the requested torque. On the other hand, although a second actuator provided on the upstream side in the intake passage is operated based on the requested torque when there is not a valid value of the second requested torque, the second actuator is operated based on the second requested torque when there is a valid value of the second requested torque. --.

Signed and Sealed this
Thirteenth Day of June, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,441,558 B2

In the Specification

At Column 7, Line 17, change "eldrq2" to -- eklrq2 --.

At Column 7, Line 32, change "eldrq2" to -- eklrq2 --.

At Column 7, Line 34, change "eptnref" to -- eprmref --.

At Column 7, Line 56, change "value a" to -- value $\alpha$ --.

At Column 7, Line 57, change "value a is" to -- value $\alpha$ is --.